United States Patent [19]

Abraham et al.

[11] Patent Number: 5,766,796
[45] Date of Patent: Jun. 16, 1998

[54] PASSIVATION-FREE SOLID STATE BATTERY

[75] Inventors: Kuzhikalail M. Abraham, Needham; Dharmasena Peramunage, Norwood, both of Mass.

[73] Assignee: EIC Laboratories, Inc., Norwood, Mass.

[21] Appl. No.: 851,876

[22] Filed: May 6, 1997

[51] Int. Cl.[6] .................. H01M 6/18; H01M 4/36
[52] U.S. Cl. ................. 429/192; 429/218; 429/224
[58] Field of Search .................. 429/192, 218, 429/224, 223, 210; 252/182.1

[56] References Cited

U.S. PATENT DOCUMENTS

| | | | |
|---|---|---|---|
| 5,219,679 | 6/1993 | Abraham et al. | 429/192 |
| 5,429,890 | 7/1995 | Pynenburg et al. | 429/192 |
| 5,561,007 | 10/1996 | Saidi | 429/224 |
| 5,609,975 | 3/1997 | Hasegawa et al. | 429/218 X |

OTHER PUBLICATIONS

Ohzuku, T., Ueda, A., and Yamamoto, N., "Zero–Strain Insertion Material of $Li[Li_{1/3}Ti_{5/3}]O_4$ for Rechargeable Lithium Cells," J. Electrochem. Soc., vol. 142, pp. 1431–1435 (1995), no month.

Primary Examiner—Anthony Skapars

[57] ABSTRACT

This invention pertains to passivation-free solid-state rechargeable batteries composed of $Li_4Ti_5O_{12}$ anode, a solid polymer electrolyte and a high voltage cathode. The solid polymer electrolyte comprises a polymer host, such as polyacrylonitrile, poly(vinyl chloride), poly(vinyl sulfone), and poly(vinylidene fluoride), plasticized by a solution of a Li salt in an organic solvent. The high voltage cathode includes $LiMn_2O_4$, $LiCoO_2$, $LiNiO_2$ and $LiV_2O_5$ and their derivatives.

7 Claims, 5 Drawing Sheets

5,766,796

PASSIVATION-FREE SOLID STATE BATTERY

This invention was made with financial support from the Department of Energy under Contract No. DE-FG02-96ER82158. The U.S. Government has certain rights in this invention.

FIELD OF INVENTION

This invention features a solid polymer electrolyte battery with anode and cathode which are passivation-free. The anode is lithiated titanium spinel $Li_4Ti_5O_{12}$, the cathode is a high voltage transition metal oxide selected from the group consisting of $LiMn_2O_4$, $LiNiO_2$, $LiCoO_2$, $LiV_2O_5$ and their derivatives, and the polymer electrolyte comprises a polymer host such as polyacrylonitrile, poly(vinyl chloride), poly(vinyl sulfone) and poly(vinylidene fluoride) plasticized with a solution of a Li salt in an organic solvent

BACKGROUND OF THE INVENTION

High power batteries are becoming increasingly important for powering modern consumer products such as cellular telephones, portable powertools, laptop computers, pagers, videocameras, and electric vehicles. Discharges at rates as high as the 5C rate (i.e., full discharge of the battery in one-fifth of one hour) are required for some of these applications. It is also desired that the batteries can be quickly recharged, preferably at the same rates as the discharge. A most important characteristic a battery must possess in order to perform at these super high rates is low internal resistance. By definition, the power (P) of a battery is given by the product of its load voltage (V) and the load current (I).

$$P = V \cdot I \quad [1]$$

From Ohm's Law, $$I = \frac{V}{R},$$

where R is the load resistance, which includes the internal resistance of the battery.

Therefore, $$P = V \cdot \frac{V}{R} = \frac{V^2}{R} \quad [2]$$

In equation [2], V is the sum of the individual cell voltages in the battery and R is the total load resistance which includes contributions from electrolyte resistance, porous electrode resistances, charge transfer resistance, electrode/electrolyte interfacial resistance from passivation films and contact resistance.

In a nonaqueous battery which uses Li metal or carbon as the anode, a Li insertion cathode, and an organic solid polymer electrolyte, the major contributors to R are the resistances of the porous electrodes ($R_{PE}$), and of the passivation film ($R_{PF}$) that forms at the interface between the anode and the electrolyte. The value of RPE is related to the physical and chemical properties of the electroactive materials used in the fabrication of the anode and cathode and is minimized by electrode engineering. The $R_{PF}$, on the other hand, results from interfacial reactions governed by the thermodynamic properties of the anode and the electrolyte and, therefore, it may be minimized by choosing appropriate electrode and electrolyte materials. Cells containing Li metal as the anode lie at the most reactive end of this spectrum of reactivity. Lithium, being the most electropositive metal, will react with the electrolyte forming product films which passivate the anode. These products will continue to accumulate on the anode surface as the cell is charged and discharged with the result that $R_{PF}$ will increase during the lifetime of the battery. When $R_{PF}$ becomes too large, the battery usually fails. Typical reactions between Li metal and the electrolyte in a battery containing the solid polymer electrolyte of the composition of polyacrylonitrile (PAN)-ethylene carbonate (EC)-propylene carbonate (PC)-$LiPF_6$ are:

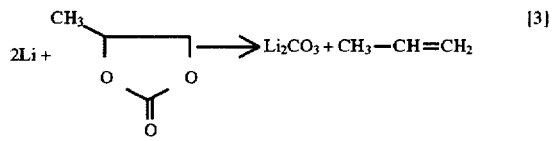

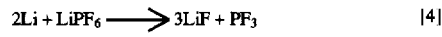

The anode surface passivation films responsible for RPF in this case are $Li_2CO_3$ and LiF. When the anode active material is carbon, these passivation films are formed on its surface also through either electrochemical reduction (equations [5] and [6]) or from chemical reactions between the Li intercalated carbon ($LiC_6$) and the electrolyte (equations [7] and [8]). Again, the cell fails to perform when the value of RPF becomes large, the exact value being a function of the discharge current density.

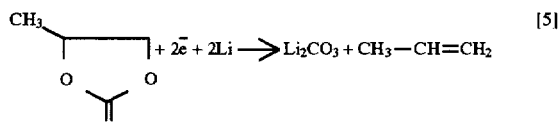

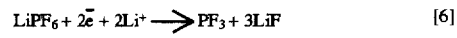

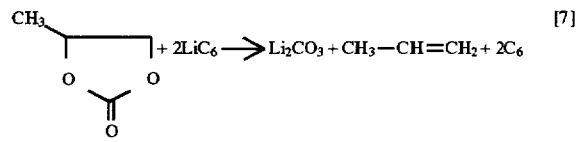

In a Li-ion cell utilizing carbon as the anode, the reactions shown in equations [5]–[8] will occur when the anode potential is at or below about 1V versus $Li^+/Li$. Jiang et al. have demonstrated this clearly in studies with graphite and the results have been reported in a paper entitled "The Electrochemical Intercalation of Li into Graphite in Li/Polymer Electrolyte/Graphite Cells", published in the Journal of the Electrochemical Society, Volume 142, pages 333–340. It occurred to us that the RPF of Li-ion batteries utilizing PAN-based electrolytes could be eliminated with the use of an anode which intercalates Li at potentials higher than 1V versus $Li^+/Li$. Consequently, it is an object of this invention to provide a Li-ion battery, utilizing PAN-based electrolytes, in which the anode intercalates and deintercalates Li at a potential greater than 1V versus $Li^+/Li$. This would result in a battery in which the anode surface would be free of passivation films formed from electrolyte reactions. The absence of passivation films will eliminate the $R_{PF}$ of the battery allowing it to be discharged and charged at high power and with long cycle life.

Polyacrylonitrile electrolyte-based solid state batteries disclosed in the past include those with Li metal anode and carbon anode. For example Abraham and Alamgir have reported (in Solid-State Ionics, 70/71, 20 (1994)) the performance of Li/LiMn$_2$O$_4$ and C/LiNiO$_2$ cells containing polymer electrolytes composed of polyacrylonitrile (PAN), propylene carbonate (PC), ethylene carbonate (EC) and a Li salt selected from LiClO$_4$, LiPF$_6$, LiAsF$_6$ and LiN(SO$_2$CF$_3$)$_2$. Abraham and Alamgir have also disclosed in U.S. Pat. No. 5,219,679, PAN-electrolyte-based solid-state cells containing Li or carbon anode, and TiS$_2$, LiNiO$_2$, LiCoO$_2$ or LiMn$_2$O$_4$ cathode. All these batteries suffer from high internal resistances due to the high resistances of the passivation films that form on the anode surface.

In this patent we disclose a PAN polymer electrolyte-based battery in which the anode is the lithiated titanium spinel Li$_4$Ti$_5$O$_{12}$ and the cathode is a high voltage lithiated transition metal oxide, preferably LiMn$_2$O$_4$. Both the anode and cathode in this battery are free from the formation of passivation films on their surfaces and, hence, it is called a passivation-free battery.

SUMMARY OF THE INVENTION

This invention pertains to a passivation film-free solid polymer electrolyte battery. It further pertains to a solid polymer electrolyte battery in which the electroactive anode is lithiated titanium oxide represented by the formula Li$_4$Ti$_5$O$_{12}$, the electroactive cathode is lithiated manganese oxide, represented by the formula LiMn$_2$O$_4$, and the electrolyte is based on polyacrylonitrile. This electrolyte consists of polyacrylonitrile plasticized by a solution of a Li salt in an organic solvent such as a mixture of ethylene carbonate and propylene carbonate. The Li salt includes low-lattice energy salts such as LiPF$_6$, LiAsF$_6$, LiSO$_3$CF$_3$, LiN(SO$_2$CF$_3$)$_2$, LiClO$_4$, LiBF$_4$ and LiC(SO$_2$CF$_3$)$_3$. The redox reactions of the Li$_4$Ti$_5$O$_{12}$ and LiMn$_2$O$_4$ electrodes leading to the generation of electric current occur within the stability window of the electrolyte so that the cathode and anode are indeed free of passivation films. The absence of passivation films gives rise to low internal resistance and consequently, high power and long cycle life for the battery.

The Li$_4$Ti$_5$O$_{12}$/LiMn$_2$O$_4$ cell has an open-circuit voltage of 2.6V, and a load voltage of 2.4–2.6V depending on the value of the load. The reactions taking place in the cell during charge and discharge are:

Anode: [9]

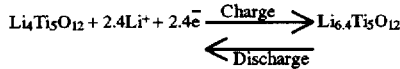

Cathode: [10]

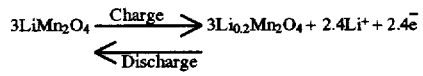

Cell [11]

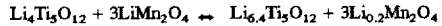

The cathode may be one other than LiMn$_2$O$_4$. For example it may be LiCoO$_2$, LiNiO$_2$ or LiV$_2$O$_5$. All of these oxides insert Li at potentials lower than that of LiMn$_2$O$_4$ and, hence, are also passivation-free when used in conjunction with polyacrylonitrile electrolytes.

The charge and discharge rates are shown in the figure.

DETAILED DESCRIPTION OF THE INVENTION

Figure 1:
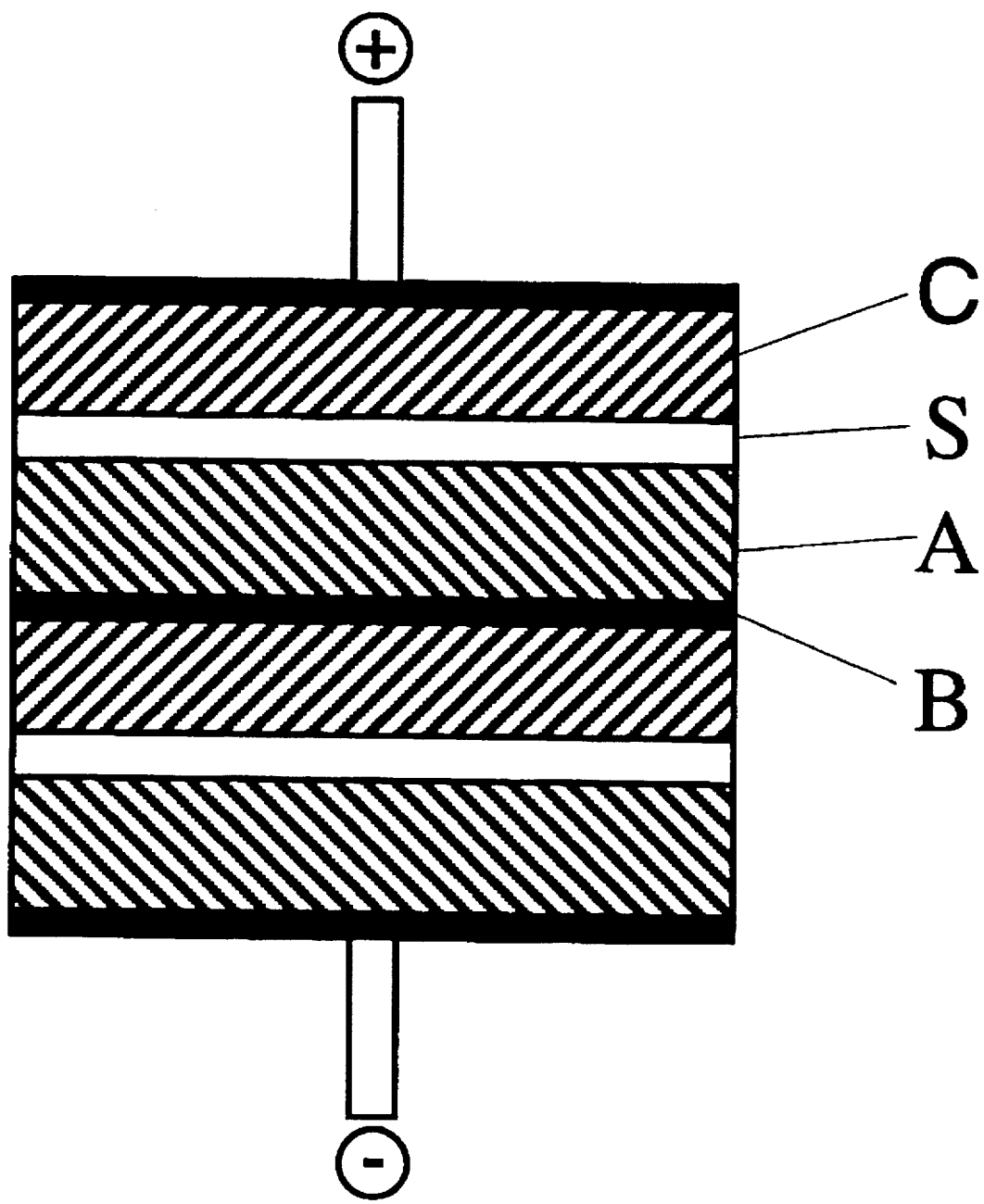
FIG. 1 Schematic of a Li$_4$Ti$_5$O$_{21}$/Polymer Electrolyte/LiMn$_2$O$_4$ battery, fabricated in the bipolar configuration.

This invention is understood by referring to FIG. 1 which depicts the Li$_4$Ti$_5$O$_{12}$//PAN electrolyte//LiMn$_2$O$_4$ battery cell. In this diagram, A is the Li$_4$Ti$_5$O$_{12}$ anode (negative electrode), S is the PAN solid polymer electrolyte and C is the LiMn$_2$O$_4$ cathode. The battery configuration is bipolar and B represents the bipolar plate. The polymer electrolyte separates the anode and cathode from electronic short-circuit and allows Li ions to move between the anode and cathode during discharge and charge of the battery. The anode A is fabricated as a composite electrode sheet consisting of the electroactive Li$_4$Ti$_5$O$_{12}$, a high surface-area carbon (such as acetylene black) and the polymer electrolyte. The acetylene black carbon is added to provide electronic conductivity to this electrode, essential to move electrons into and out of the electroactive material during charge and discharge, and the polymer electrode is added to provide ionic conductivity to the electrode which is essential to move Li ions into and out of the electroactive material during charge and discharge. The cathode C is also fabricated as a composite electrode consisting of LiMn$_2$O$_4$, acetylene black carbon and the polymer electrolyte where the carbon and the polymer electrolyte serve the same purposes they serve in the composite anode.

The PAN polymer electrolyte is composed of polyacrylonitrile, ethylene carbonate, propylene carbonate and LiPF$_6$. A typical electrolyte composition is 12.4 weight percent (w/o) PAN, 35.8 w/o EC, 41.6 w/o PC and 10.2 w/o LiPF$_6$ and it has a room temperature conductivity of 2×10$^3$ ohm$^{-1}$.cm$^{-1}$. Li salts other than LiPF$_6$ can be used and they include LiAsF$_6$, LiClO$_4$, LiN(SO$_2$CF$_3$)$_2$, LiBF4 and LiC(SO$_2$CF$_3$)$_2$. The requirement of a Li salt useful for preparing this electrolyte is that it is sufficiently soluble in the electrolyte to form a well-conducting membrane. While the preferred polymer electrolyte is one based on polyacrylonitrile polymer, those based on other polymer hosts can also be used. These latter include poly(vinyl chloride), poly(vinyl sulfone), poly(vinyl pyrrolidinone), poly(ethylene glycol diacrylate), poly(vinylidine fluoride, poly(tetrahydrofuran), poly(dioxolane) and poly(ethylene oxide), their derivatives and mixtures thereof.

Li salts and solvents suitable for preparing the electrolytes of this invention are preferably selected on the basis of the same principles used for selecting these components for highly conductive liquid electrolytes. These requirements include: 1) Li salts having large anions and low lattice energies, such as LiClO$_4$, LiAsF$_6$, LiBF$_4$, LiCF$_3$SO$_3$, LiPF$_6$ and LiN(CF$_3$SO$_2$)$_2$; 2) organic solvents with high dielectric constants to promote the dissociation of the low lattice energy Li salts, thereby forming highly conductive electrolyte medium; 3) organic solvents having electron donor atoms such as O and N through which the solvents can form complexes (or solvates) with the Li ions of the Li salt. These requirements are realized with Li salts such as $LiClO_4$, $LiBF_4$, $LiPF_6$, $LiN(SO_2CF_3)_2$, $LiC(SO_2CF_3)_3$ and $LiAsF_6$, and organic solvents such as PC and EC with dielectric constants of 64.4 and 89.6, respectively.

In addition to ethylene carbonate and propylene carbonate, organic solvents preferred for preparing solid polymer electrolytes of the present invention are dimethyl carbonate, diethyl carbonate, ethyl methyl carbonate, dimethyl sulfoxide (DMSO), tetramethylene sulfone (sulfolane), γ-butyrolactone, N-methyl pyrrolidinone (NMP) and (poly ethylene glycol) dimethyl ether oligomers. These solvents have high boiling points, which augment the preparation of polymer electrolyte films with good dimensional stability. Dimensional stability is defined as the ability of the electrolyte to be isolated as free-standing films. An important criterion for a suitable polymer electrolyte is that it should neither be reduced nor oxidized at the potential range where the anode and cathode active materials, $Li_4Ti_5O_{12}$, and $LiMn_2O_4$ undergo Li insertion and extraction reactions. The insertion/extraction reactions of Li into and from $Li_4Ti_5O_{12}$ (equation 9) occur at about 1.3V versus $Li^+/Li$ and that into and from $LiMn_2O_4$ (equation 10) occur in the range of 3.5 to 4.2V versus $Li^+/Li$. Therefore, an electrolyte suitable for the subject battery should have a stability window (i.e., a potential range of electrochemical inactivity) spanning the range of 1–4.5V versus $Li^+/Li$. This criterion is met by PAN electrolytes and, consequently, they are the preferred electrolytes. They undergo neither reduction or oxidation in this potential range and, hence, no passivation film is formed on the anode and cathode surfaces. The $Li_4Ti_5O_1$//PAN electrolyte//$LiMn_2O_4$ battery is, therefore, passivation-free.

Figure 2:
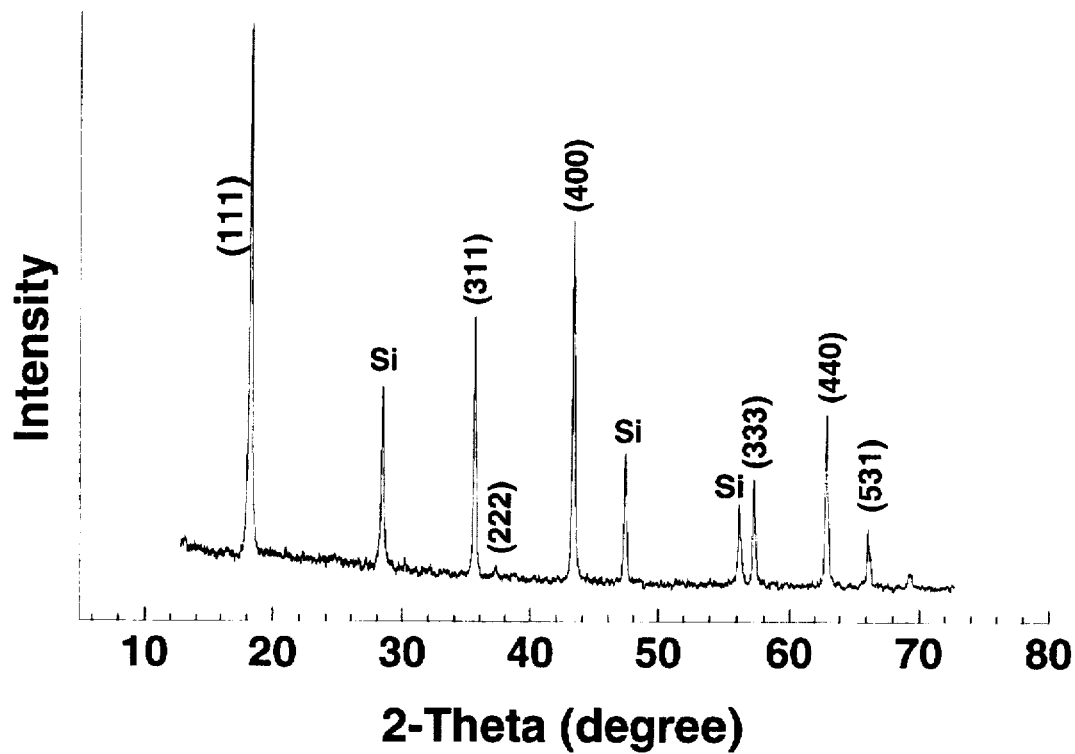
FIG. 2. X-ray diffraction pattern of Li$_4$Ti$_5$O$_{12}$ prepared from Li$_2$CO$_3$ and TiO$_2$. The peaks marked Si are due to Si used as an internal standard.

The $Li_4Ti_5O_{12}$ anode active material for this battery is conveniently synthesized from $Li_2CO_3$ and $TiO_2$ by heating an intimate mixture of the two at 800° C. The composition of $Li_4Ti_5O_{12}$ is confirmed from its X-ray diffraction pattern (FIG. 2). The $LiMn_2O_4$ cathode active material is synthesized from a mixture of LiOH and $MnO_2$ by heating it at 750° C. It has the well established spinel structure.

Figure 3:
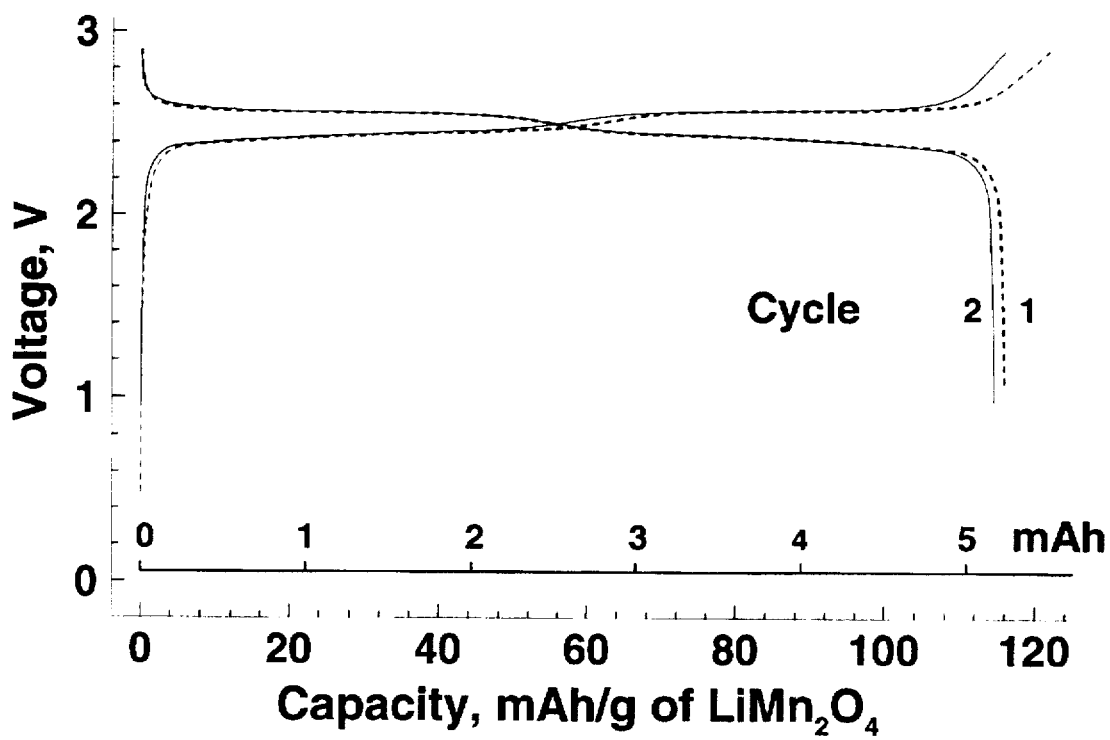
FIG. 3. Typical charge/discharge cycles of a Li$_4$Ti$_5$O$_{12}$//PAN polymer electrolyte//LiMn$_2$O$_4$ cell.

The discharge/charge behavior of the $Li_4Ti_5O_{12}$/PAN electrolyte/$LiMn_2O_4$ battery is depicted in FIG. 3. The discharge capacity of the cell varied between 112.6 and 65.3 mAh/g of $LiMn_2O_4$ when the current was varied between 0.02 and 5.0 mA/cm². The coulombic efficiency of the charge and discharge was nearly one hundred percent which underscores the excellent reversibility of this battery.

Figure 4:
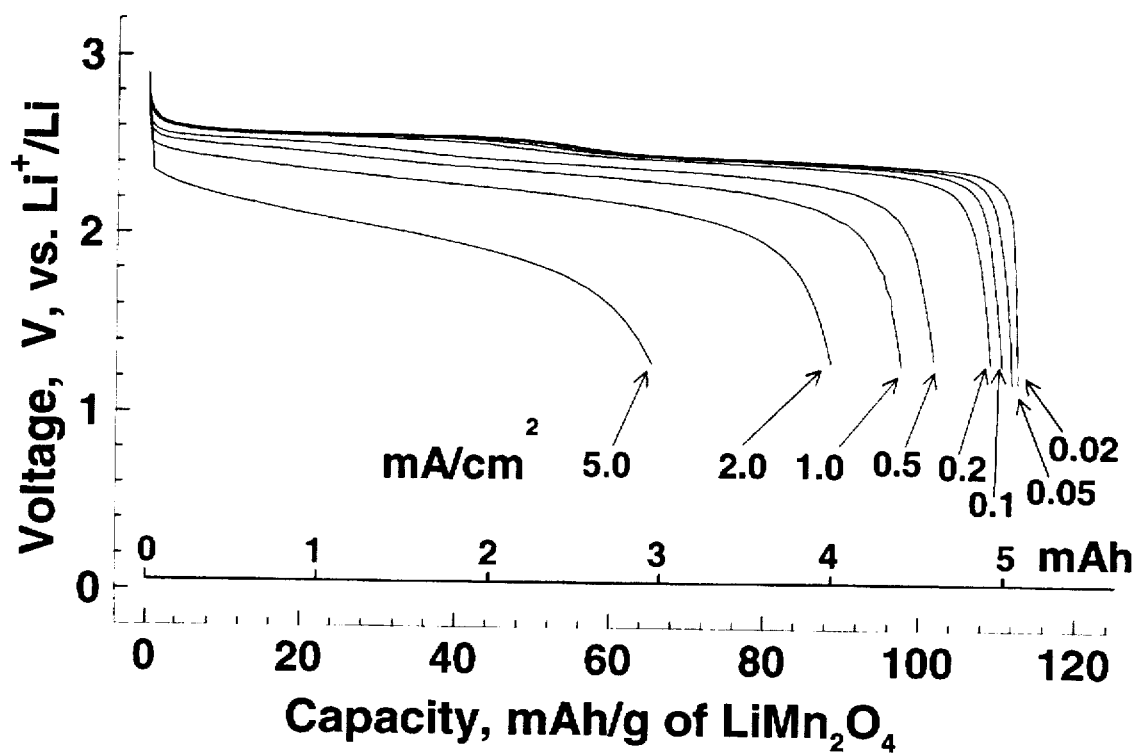
FIG. 4. High power discharges of a Li$_4$Ti$_5$O$_{12}$//PAN polymer electrolyte//LiMn$_2$O$_4$ cell. The current densities are shown on the curves.
Figure 5:
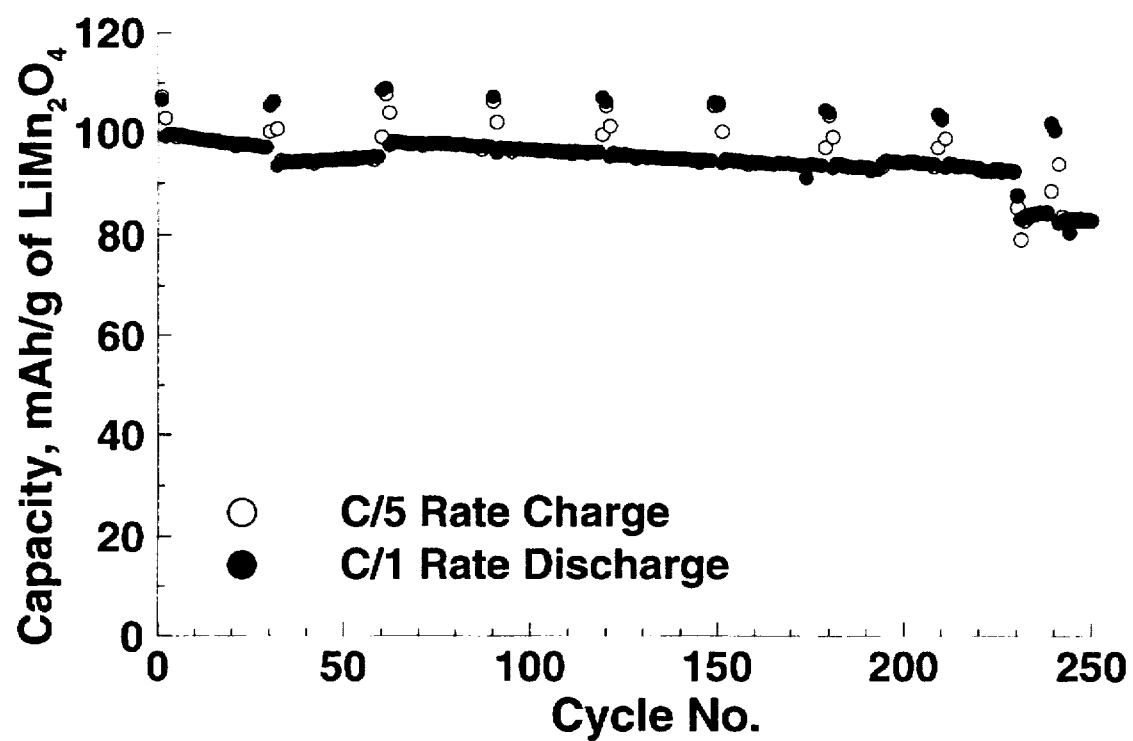
FIG. 5. Capacity versus cycle number for a Li$_4$Ti$_5$O$_{12}$//PAN polymer electrolyte//LiMn$_2$O$_4$ cell.

This battery can be discharged at very high rates as revealed by the data in FIG. 4. The long cycle life of the battery is exemplified by the data in FIG. 5.

The preferred cathode is $LiMn_2O_4$. However, other cathodes such as $Li_xCoO_2$ and $LiNiO_2$, $Li_xV_2O_5$ and mixed metal oxides derived from them can be used. Cathodes derived from metal chalcogenides are also suitable. The requirements of a cathode are that it is of sufficiently high voltage to provide a cell voltage of ≥1.5V and that Li insertion into and extraction from the cathode occur at potentials below where the oxidation of the PAN electrolyte occurs, i.e., about 4.5V versus $Li^+/Li$, so that the cathode is passivation-free.

The following, non-limiting, examples set forth herein below illustrate certain aspects of this invention.

EXAMPLE 1

Synthesis of $Li_4Ti_5O_{12}$

In a typical synthesis, 18.25 g of submicron particle size $TiO_2$ and 6.75 g of submicron $Li_2CO_3$ were dispensed in hexane to produce an intimate mixture of the two solids. The hexane was then removed by pumping it out in vacuum and the remaining solid residue was transferred to an alumina boat. It was then calcined in a stream of oxygen at 800° C. for 15 hours. The product was obtained as a fine powder. Its X-ray diffraction pattern, shown in FIG. 1, is consistent with pure, single phase $Li_4Ti_5O_{12}$ (Reference: Ohzuku, et al., J. Electrochem. Soc., 142, 1431 (1995). It consisted of particles less than one μm size. The starting materials used in this synthesis is different from that used by Ozuku et al., thereby resulting in an impurity-free material.

EXAMPLE 2

Synthesis of $LiMn_2O_4$

The starting materials for the preparation of $LiMn_2O_4$ are electrolytic manganese dioxide ($MnO_2$) and lithium hydroxide. Electrolytic $MnO_2$ (EMD) was ground and sieved through 35 μm sieve. In the meantime 25 mil of distilled $H_2O$ was combined with 8.74 g of LiOH in a Teflon container and stirred to form a uniform milky-white suspension. 64.11 g of the ground EMD were added to this suspension and the mixture was stirred until a uniform black paste was formed. The mixture was dried for 16 hours at 120° C. to drive off the $H_2O$. The dry residue was ground and heated in a ceramic boat at 750° C. under flowing oxygen for 48 hours. The product was removed from the furnace, ground and heated again at 750° C. for another 12 hours. The furnace was then turned off and when it cooled to room temperature, the product was removed. The X-ray diffraction pattern of the material showed it to be pure single-phase spinel $LiMn_2O_4$.

EXAMPLE 3

Fabrication of $Li_4Ti_5O_{12}$ Electrodes and Evaluation of Its Electrochemical Performance The electrochemical capacity evaluation of $Li_4Ti_5O_{12}$ was carried out in polymer electrolyte cells of the configurations Li//PAN Polymer electrolyte/$Li_4Ti_5O_{12}$ in which the anode was Li metal. This cell was fabricated by sandwiching a PAN polymer electrolyte membrane of about 50 μm thick with a Li foil anode and the $Li_4Ti_5O_{12}$ composite cathode and sealing the resulting cell package in a metallized polyethylene plastic bag under vacuum. The PAN polymer electrolyte used had the composition: 12 w/o PAN, 35.8 w/o EC, 41.6 w/o PC and 10.2 w/o $LiPF_6$. The cells were discharged at a series of current densities ranging from 0.02 to 5.0 mA/cm² with each discharge followed by a charge at 0.02 mA/cm². The discharge cutoff voltage was 1.2V and the charge cutoff voltage was 2.5V. The cell capacity was calculated as mAh/.g of $Li_4Ti_5O_{12}$ and the results are summarized in Table 1.

TABLE 1

| Capacities of $Li_4Ti_5O_{12}$ at Different Current Densities | | |
|---|---|---|
| Discharge Current Density (mA/cm²) | Mid-discharge Voltage (V) | Capacity (mAh/g of $Li_4Ti_5O_{12}$) |
| 0.2 | 1.528 | 150.0 |
| 0.5 | 1.493 | 135.8 |
| 1.0 | 1.460 | 120.7 |
| 2.0 | 1.418 | 105.0 |
| 5.0 | 1.317 | 70.9 |

EXAMPLE 4

Fabrication of $LiMn_2O_4$ Electrodes and Evaluation of Its Electrochemical Performance The electrochemical capacity of $LiMn_2O_4$ was evaluated in cells of the configuration $Li_{(4+x)}Ti_5O_{12}$ (x~1.2)//PAN polymer electrolyte//$LiMn_2O_4$. Potentials of the electrodes were monitored to a Li reference. The cells were assembled as described in Example 3.

The cells were discharged at a series of current densities ranging from 0.02 to 5.0 $mA/cm^2$ with each discharge followed by charge at 0.2 $mA/cm^2$. The end voltage for discharge was 2.9V vs. Li and that for charge was 4.25 V vs. Li. The results are summarized in Table 2. The capacities are given as mAh/g of $LiMn_2O_4$.

TABLE 2

Capacities of $LiMn_2O_4$ at Different Current Densities

| Discharge Current Density ($mA/cm^2$) | Mid-discharge Voltage (V) | Capacity (mAh/g of $LiMn_2O_4$) |
| --- | --- | --- |
| 0.5 | 3.96 | 105.8 |
| 1.0 | 3.89 | 96.2 |
| 2.0 | 3.76 | 79.8 |
| 5.0 | 3.47 | 48.5 |

EXAMPLE 5

Fabrication of $Li_4Ti_4O_{12}$/PAN Polymer Electrolyte// $LiMn_2O_4$ Cells and Their Electrochemical Performance Evaluation The $Li_4Ti_5O_{12}$//PAN electrolyte//$LiMn_2O_4$ cell was fabricated by sandwiching a 50 μm thick PAN polymer electrolyte with a 28 μm thick $Li_4Ti_5O_{12}$ electrode and a 46 μm thick $LiMn_2O_4$ electrode with capacities of 5.9 mAh and 6.7 mAh, respectively. The electrode areas were 11.3 $cm^2$ for $Li_4Ti_5O_{12}$ and 10.0 $cm^2$ for $LiMn_2O_4$. The cell was packaged in metallized plastic bag as described in Examples 3 and 4. The cell was cycled at room temperature between the voltage limits of 2.9V for charge and 1.2V for discharge. The electrochemical evaluation included measurements of charge/discharge voltage profiles as a function of depth of discharge and charge; capacity versus rate behavior and cycle life. The following data are representative of the system.

Charge/discharge behavior: The cell is activated by charging. Typical charge/discharge cycles are shown in FIG. 3. The mid-discharge voltage is 2.49V and the mid-charge voltage is 2.52V. The discharge capacity corresponds to the utilization of 153.0 mAh/g of $Li_4Ti_5O_{12}$ and 114.6 mAh/g of $LiMn_2O_4$.

Capacity versus rate: The discharge capacity of the cell was evaluated at a series of current from 0.02 $mA/cm^2$ to 5.0 $mA/cm^2$. These corresponds to the rates of C/33 to 7.5 C. The results are summarized in Table 3. Typical discharges are depicted in FIG. 4.

TABLE 3

Capacities of $Li_4Ti_5O_{12}$/$LiMn_2O_4$ Cells at Different Rates

| Discharge | | |
| --- | --- | --- |
| Current Density ($mA/cm^2$) | C-Rate | Capacity (mAh/g of $LiMn_2O_4$) |
| 0.5 | 0.75 | 101.7 |
| 1.0 | 1.5 | 97.6 |
| 2.0 | 3.0 | 88.5 |
| 5.0 | 7.5 | 65.3 |

Cycle life: A plot of capacity versus cycle number for the cell is given in FIG. 5. The total impedance of the cell initially was 3Ω which showed little change with cycling. After 150 cycles, it was 3.2Ω which indicates the passivation-free nature of the electrodes.

The foregoing description of the preferred embodiment should be taken as illustrating, rather than as limiting the present invention as defined by the claims. Numerous variations and combinations of the features described above can be utilized without departing from the present invention.

We claim:

1. A passivation-free rechargeable battery comprising $Li_4Ti_5O_{12}$ anode active material, poly(acrylonitrile) polymer electrolyte and $LiMn_2O_4$ cathode active material.

2. A rechargeable battery of claim 1 where in the said polyacrylonitrile polymer electrolyte is composed of polyacrylonitrile, a plasticizer solvent and Li salt.

3. A rechargeable battery of claim 2 wherein said Li salt is a low-lattice energy salt selected from $LiAsF_6$, $LiPF_6$, $LiClO_4$, $LiSO_3CF_3$, $LiBF_4$, $LiN(SO_2CF_3)_2$ and $LiC(SO_2CF_3)_3$.

4. A rechargeable battery of claim 3 wherein the said plasticizer solvent is composed of a mixture of ethylene carbonate and propylene carbonate.

5. A rechargeable battery of claim 3 where in the said plasticizer solvent is selected from ethylene carbonate, propylene carbonate, dimethyl carbonate, diethyl carbonate, dipropyl carbonate, methyl ethyl carbonate, poly(ethylene glycol) dimethyl ether oligomers and mixtures thereof.

6. A passivation-free rechargeable battery comprising $Li_4Ti_5O_{12}$ anode, polyacrylonitrile polymer electrolyte and a cathode selected from the group consisting of $LiMn_2O_4$, $LiCoO_2$, $LiNiO_2$, $LiV_2O_5$ and their derivatives.

7. A passivation-free rechargeable battery comprising $Li_4Ti_5O_{12}$ anode, a cathode selected from the group consisting of $LiMn_2O_4$, $LiCoO_2$, $LiNiO_2$ and $LiV_2O_5$ and a polymer electrolyte wherein the said polymer electrolyte is derived from a polymer host selected from polyacrylonitrile, poly(vinylidene fluoride), poly(vinylidene fluoride)-hexafluoropropane, copolymer, poly(vinyl chloride), poly(ethylene glycol diacrylate) and poly(vinyl sulfone).

* * * * *